United States Patent
Samar

(10) Patent No.: US 7,779,113 B1
(45) Date of Patent: Aug. 17, 2010

(54) AUDIT MANAGEMENT SYSTEM FOR NETWORKS

(75) Inventor: Vipin Samar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1199 days.

(21) Appl. No.: 10/304,383

(22) Filed: Nov. 25, 2002

(51) Int. Cl.
*G06F 15/173* (2006.01)
*G06F 7/00* (2006.01)
*G06F 3/00* (2006.01)

(52) U.S. Cl. .................. 709/224; 707/600; 707/607; 707/608; 707/609; 719/318; 719/319

(58) Field of Classification Search .......... 709/223, 709/246, 201, 220, 224; 715/523; 719/318–319; 726/1, 2, 22, 26; 707/600, 607–609
See application file for complete search history.

(56) References Cited

U.S. PATENT DOCUMENTS

| | | | | |
|---|---|---|---|---|
| 5,557,742 A * | 9/1996 | Smaha et al. | ............... | 726/22 |
| 5,621,889 A * | 4/1997 | Lermuzeaux et al. | ......... | 726/22 |
| 6,012,095 A * | 1/2000 | Thompson et al. | .......... | 709/231 |
| 6,065,014 A * | 5/2000 | Wakio et al. | ........................ | 1/1 |
| 6,070,244 A * | 5/2000 | Orchier et al. | ................. | 726/1 |
| 6,134,549 A * | 10/2000 | Regnier et al. | ..................... | 1/1 |
| 6,134,664 A * | 10/2000 | Walker | ........................ | 726/22 |
| 6,189,038 B1 * | 2/2001 | Thompson et al. | .......... | 709/231 |
| 6,212,558 B1 * | 4/2001 | Antur et al. | .................. | 709/221 |
| 6,347,374 B1 * | 2/2002 | Drake et al. | .................... | 726/1 |
| 6,401,132 B1 * | 6/2002 | Bellwood et al. | ........... | 709/246 |
| 6,408,391 B1 * | 6/2002 | Huff et al. | ..................... | 726/22 |
| 6,418,446 B1 * | 7/2002 | Lection et al. | ..................... | 1/1 |
| 6,467,052 B1 * | 10/2002 | Kaler et al. | .................... | 714/39 |
| 6,714,979 B1 * | 3/2004 | Brandt et al. | ............... | 709/225 |
| 6,839,850 B1 * | 1/2005 | Campbell et al. | ............. | 726/23 |
| 6,871,284 B2 * | 3/2005 | Cooper et al. | .................. | 726/1 |
| 6,938,262 B2 * | 8/2005 | Bao et al. | .................... | 719/329 |
| 6,941,557 B1 * | 9/2005 | Jakobson et al. | ............ | 719/316 |
| 7,039,953 B2 * | 5/2006 | Black et al. | .................... | 726/14 |
| 7,065,566 B2 * | 6/2006 | Menard et al. | .............. | 709/223 |
| 7,076,543 B1 * | 7/2006 | Kirti et al. | ................... | 709/223 |
| 7,124,438 B2 * | 10/2006 | Judge et al. | .................... | 726/22 |
| 7,134,141 B2 * | 11/2006 | Crosbie et al. | ................ | 726/23 |
| 7,228,304 B1 * | 6/2007 | Wong et al. | ........................ | 1/1 |
| 7,353,269 B2 * | 4/2008 | Aki et al. | ..................... | 709/224 |
| 7,363,588 B2 * | 4/2008 | Saleh et al. | .................. | 715/746 |
| 7,580,996 B1 * | 8/2009 | Allan et al. | .................. | 709/224 |
| 2002/0010803 A1 * | 1/2002 | Oberstein et al. | ........... | 709/318 |
| 2002/0010804 A1 * | 1/2002 | Sanghvi et al. | ............. | 709/318 |
| 2002/0073187 A1 * | 6/2002 | Rawson, III | ................ | 709/223 |
| 2002/0120736 A1 * | 8/2002 | Stuart Martin et al. | ...... | 709/224 |
| 2002/0138607 A1 * | 9/2002 | O'Rourke et al. | .......... | 709/224 |
| 2002/0143911 A1 * | 10/2002 | Vicente et al. | .............. | 709/223 |
| 2003/0135593 A1 * | 7/2003 | Lee et al. | ..................... | 709/223 |
| 2003/0233439 A1 * | 12/2003 | Stone et al. | ................. | 709/223 |

(Continued)

*Primary Examiner*—Kamal B Divecha
(74) *Attorney, Agent, or Firm*—Hickman Palermo Truong & Becker LLP

(57) ABSTRACT

Audit records generated from applications running on multiple machines in a computer network are managed on an audit management system. Audit records are sent by the applications over a network to the audit management system. One or more operations are performed on the audit records within the audit management system. After the one or more operations are performed, data representing the audit records from the different applications is written by the audit management system to a repository.

14 Claims, 5 Drawing Sheets

U.S. PATENT DOCUMENTS

2004/0019669 A1* 1/2004 Viswanath et al. .......... 709/223
2004/0088386 A1* 5/2004 Aggarwal ................... 709/220
2004/0205773 A1* 10/2004 Carcido et al. .............. 719/318

* cited by examiner

AUDIT MANAGEMENT SYSTEM FOR NETWORKS

FIELD OF THE INVENTION

The present invention relates to network management. In particular, this invention relates to an audit management system for computer networks.

BACKGROUND OF THE INVENTION

Audit assurance, authentication, and authorization form the basis of a security infrastructure for a network. These functions in combination can be used to provide answers to questions such as the identity of a network user, the user's authorization to use certain network resources, and the actions performed by the user. These functions have specific importance when determining when a network system has been "hacked".

Often times, the security infrastructure is formed from components that have their own realm of authentication, authorization and audit. These components may operate on different layers, have different manufacturers, and use different platforms. Thus, trying to coordinate the use of a security infrastructure is often a complex and ad-hoc procedure. Often, breaches in security are not even detected because the security infrastructure of a network is too difficult to coordinate. As a result, only obvious security breaches, such as the defacing of a web-page, are detected by security administrators of a network. However, it is much more difficult to detect the breaches in the internal systems, the applications, and the databases, which typically form the backbone of an administered system.

Maintaining audit records can be particularly complex because individual components maintain their own style and format of generating, consolidating, analyzing and managing the audit records. The analysis of consolidated audit records from multiple systems is critical to determining when security breaches occur, as well as for understanding the overall security of the network. Currently, security administrators have two ways to manage audit records. First, they may login into multiple software components and learn the specific audit tool of that component. Second, they may collect audit record data from multiple end points, convert the data to some canonical form, and then analyze it.

Past attempts to centralize audit management have met with mixed results. Systems such as ETRUST, manufactured by COMPUTER ASSOCIATES INTERNATIONAL INC., aggregate audit records, but do so by periodically pulling audit records from applications. The periodic pulling of audit records often does not occur until many hours after the breach has occurred. Even when a breach is in process, the audit records are pulled at discrete intervals, making in-progress detection of the breach difficult. Furthermore, because the audit records come from different applications, they typically have distinct formats. Thus, very little analysis can be performed on the audit records once they are aggregated.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
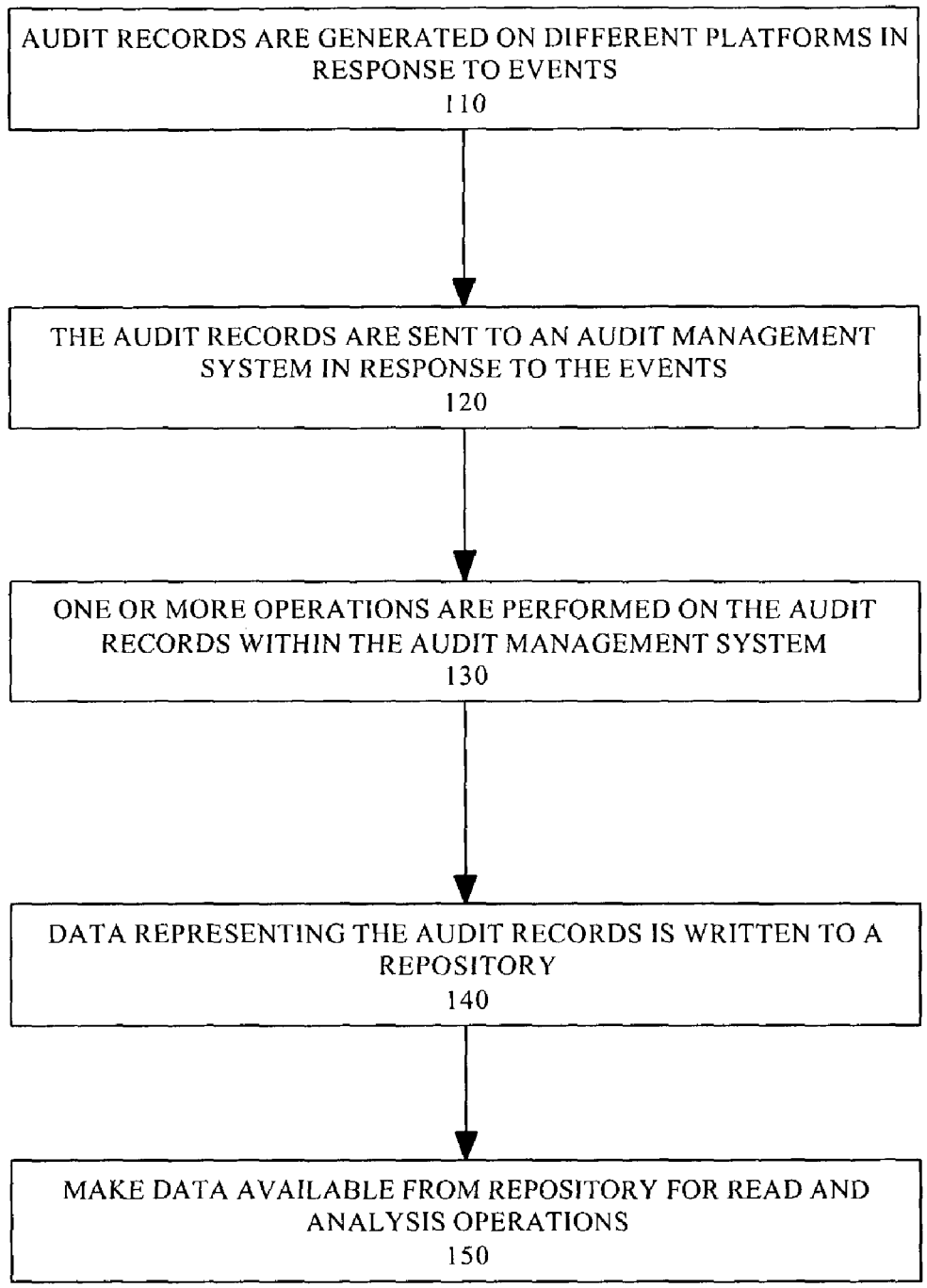
FIG. 1 is a flowchart illustrating the operations of an audit management system.

A method and apparatus for managing audit records is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to an embodiment, audit records generated from applications running on multiple machines are managed on an audit management system. Audit records are sent by the applications over a network to the audit management system. One or more operations are performed on the audit records within the audit management system. After the one or more operations are performed, data representing the audit records from the different applications is written by the audit management system to a repository.

Different functions may be performed on the audit records as they are received by the audit management system. In one embodiment, the audit records are queued, enabling the applications to asynchronously send the audit records to the audit management system. The audit management system may also perform logical operations on the audit records, including operations to identify a user that caused the generation of the audit records, as well operations to convert the form of the audit record to a canonical format.

Among other features of embodiments described herein, audit records can be directly transferred to the repository asynchronously, in response to events that cause the audit records to be generated. Thus, embodiments described herein enable an application to continuously transfer audit records to a repository as the audit records are generated. The audit records may also be transferred synchronously from the applications to the repository. In a synchronous transfer, the application sending the audit records waits for an acknowledgement from the recipient before sending another audit record to that recipient. In asynchronous transfers, the application sending the audit record does not wait for the acknowledgement from the recipient, but rather keeps sending the audit records as they are generated. Furthermore, the audit records may be generated by the application either, on a record by record basis, or after batching a sufficient number of records.

In one embodiment, a plurality of audit records originating from one or more applications is converted from a native form into a canonical form. After the conversion is performed, data representing the audit records is written to the repository.

The audit management system may be accessible over a network. Alternatively, the audit management system may be distributed in part as agents on machines that have applications for generating the audit record. Therefore, the conversion of the audit records, as well as other operations, may be performed either before or after the audit records are transmitted over the network to the repository.

Accordingly, embodiments provide that audit records may be stored in a repository in a form that facilitates subsequent analysis of the audit records. Audit records that would otherwise be dissimilar to each other because of different native formats can be more readily analyzed in the repository when converted into a common format. As such, security issues may be investigated and analyzed more effectively.

In an embodiment, analysis of the audit records may be facilitated by storing the audit records in a name-space schema, where definitions within the fields of the audit records are self-describing for purpose of performing analysis operations. The data may also be non-repudiatable after it is stored, so that, for example, the audit records may provide evidentiary use in completing business transactions. Other functional features for use with embodiments of the invention are described in greater detail below.

In another embodiment, a method is provided where a first set of audit records is proactively pushed to an audit management system from a first source, and a second set of audit records is proactively pushed to the audit management system. The first set of audit records is in a first format and is subsequently converted to audit data having a common format by the audit management system. The second set of audit records is in a second format and is subsequently converted to audit data in the common format by the audit management system. The first audit data and the second audit data are stored in a repository in the common format.

Functional Overview

FIG. 1 is a flowchart illustrating the operations of an audit management system. An audit management system such as described may enable audit records generated by applications to be transferred across a network into a centralized location. The applications that generate the audit records may be provided on different machines. In addition, the audit records generated by the different applications may be dissimilar, in that the applications may use different platforms or formats.

In step 110, audit records are generated by different applications in response to events that are designated to generate audit records on those applications. The applications may operate on different platforms and machines. An event that may cause an application to generate an audit record may correspond to an action taken by a user during a session in which the application or other resources on the network are accessed. The audit record may describe the event. Typically, an audit record will identify the user who performed the action, as well as some description about the action performed. For example, the action may correspond to a user logging on, accessing a web-site, opening a document, performing a transaction or sending an email. Other information may also be included in the audit record, such as the time the event took place, and the application that generated the audit record. It is also possible for the events to correspond to automatic actions performed by machines, or applications executing on machines. For example, a server application may participate in a session where the server application accesses another machine automatically to receive data. The initiation of the session may cause the terminal to generate audit records of the event.

Step 120 provides that the audit records are sent to an audit management system in response to the events taking place. Thus, the audit records are generated and sent to the audit management system automatically, and in response to the events that generate the audit records. In an embodiment, the audit records are sent to the audit management system in near real-time, meaning that the generation and transfer of the audit records to the audit management system happens shortly after the event that caused the audit record to be generated. This is in contrast to other systems, which periodically pull audit records from client applications.

The applications may "push" the audit records to the audit management system. In such instances, the audit records may be sent to the audit management system without any prompting from the audit management system. In one embodiment, one or more of the applications may be internally configured to automatically push audit records. The audit records may be pushed immediately after the audit records are generated. In another embodiment, agents, or other components that interface with the application, may cause the application to continuously generate the audit records and/or immediately send the audit records to the audit management system.

In step 130, one or more operations are performed on the audit records within the audit management system. Thus, in an embodiment where audit records from different applications are aggregated, operations may be performed on the audit records after the aggregation occurs. In an embodiment, one operation performed on the audit records is a queue operation, where the audit records are queued in response to the audit records being sent to the audit management system. Queuing the audit records at an intermediate stage permits other operations that facilitate and use of the audit records in a data store. For example, the applications that generate the audit records can send the audit records asynchronously, so that they can send more audit records without having to wait for acknowledgements.

In another embodiment, logical operations, such as translation conversions, transformation conversions, and/or mapping operations are performed on the audit records within the audit management system. A more detailed discussion of operations that are performed on the audit records is provided below.

In step 140, data representing the audit records is written to a repository of the audit management system. In an embodiment, the data is structured in as per the name-space schema, such as extensible markup language ("XML"). Use of the data in XML or similar format facilitates analysis of the data in step 150 because the name-space schema describes the content and the structure of the audit data. One embodiment also provides that the data is stored in an insert- and read only repository, in a process sometimes referred to as "non-repudiation". For purpose of this application, data stored in a non-repudiation process is alternatively termed "non-repudiatable". A consequence of non-repudiation is that once the data is written to the repository, it cannot be deleted or updated.

Step 150 provides that the data is made available for read and analysis operations. Once the audit records are stored, they may be analyzed using analysis tools. The audit records may also be utilized from the repository. In one embodiment, read operations may be by "web-service", or other automated machine-to-machine communication connection. For example, one machine may connect to the audit management system through HyperText Transfer Protocol ("HTTP"), Simple Object Access Protocol ("SOAP"), or some other similar protocol. In this way, the data stored in the repository is automatically read by other machines that connect to the audit management system through a network such as local area network ("LAN"), Intranet, or Internet. In another embodiment, the data can be analyzed through several types of analysis tools, such as an Online Analytical Processing ("OLAP") tool, or ORACLE WAREHOUSE BUILDER, manufactured by ORACLE CORP. Step 150 is optional, in that audit records can be stored, but not necessarily read or analyzed through use of programming tools. Rather, one entity or vendor may aggregate audit records, while another entity may perform analysis operations on the audit records.

System Architecture

Figure 2:
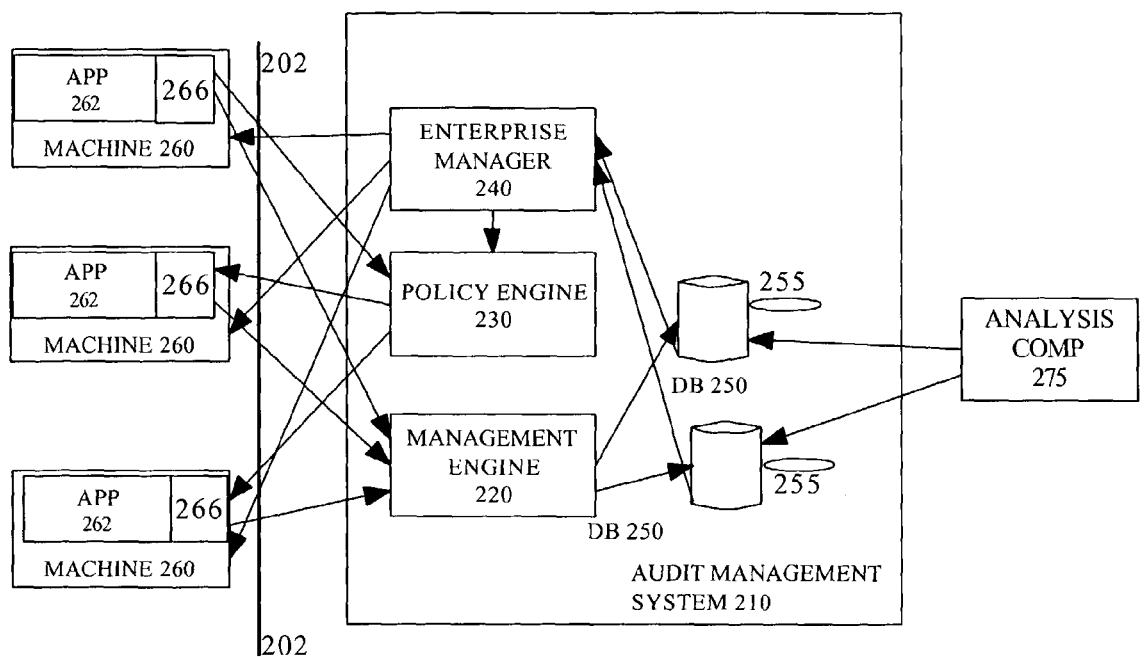
FIG. 2 illustrates a system for managing audit records, under an embodiment of the invention.

FIG. 2 illustrates a system for managing audit records, under an embodiment of the invention. In FIG. 2, an audit management system (AMS) 210 communicates with a plurality of machines 260 over a network 202. Each of the machines 260 includes one or more applications 262 that generate audit records in response to events. Each machine 260 (or application 262) may be provided a corresponding agent 266 to assist the functions of AMS 210.

In an embodiment, components of the AMS 210 include a management engine 220, a policy engine 230, and an enterprise manager 240. The AMS 210 may also include one or more databases 250 as its repositories for storing data obtained from audit records. In an embodiment, AMS 210 provides an interface 255 to data stored in its databases 250. An analysis component 275 may respond to analysis queries by retrieving data corresponding to the queries from the databases 250. The analysis component 275 may also include logic or analysis tools for intelligently retrieving data from the databases 250. The analysis component 275 may also include logic to trigger events within other components of AMS 210, or perform other notification such as sending an alert or email message to the security administrator, or publish periodic reports. The analysis component 275 may be automated, or responsive to commands from an administrator or other source.

In an embodiment, the applications 262 generate audit records in response to events detected on their respective machines 260. The events may be external to machines 260, or alternatively, may be created by the machines, or otherwise internal to the machines. The audit records are sent to the AMS 210, possibly through the use of agent 266. The management engine 220 performs one or more operations on the audit records as the records are received. The management engine 220 then writes data to the databases 250, where the data is representative of the audit records received from the applications.

A policy by which audit records are generated and/or transferred to AMS 210 is executed by policy engine 230 and applied to applications 262 and/or agents 266. The enterprise manager 240 monitors audit records by inspecting data written to the databases 250. Alternatively, the enterprise manager 240 inspects the audit records as they are sent to the AMS 210. In either case, the enterprise manager 240 may perform some action in response to detecting some characteristic from the audit records.

Once the data is written to databases 250, an embodiment provides that the data can be made available to be read by other machines or users through an interface 255. In another embodiment, an analysis component 275 may also have access to the data stored in the databases 250.

The AMS 210 optionally performs operations on the audit records before the audit records are recorded in the databases 250. The operations may be performed through use of components such as management engine 220, policy engine 230, and enterprise manager 240. In addition, agents 266 perform functions as part of or in conjunction with the AMS 210. A more detailed description of each of these components is provided below.

Application Agents

The machines 260 and their respective applications 262 may have different platforms or proprietary structures. As a result, not all of the machines 260 or applications 262 may be configured to deliver audit records to the AMS 210 in the same manner. For example, one embodiment provides that AMS 210 is pushed audit records as the audit records are generated on the respective machines 260. But not all applications 262 may be configured to push audit records in real-time. In order to accommodate different applications 262, agents 266 may be provided on select machines to cause the applications to deliver the audit records in a manner that is selected for AMS 210. Thus, an application 262 that is originally adapted to have its audit records pulled, but not to push the audit records, may be configured to include the corresponding agent 266 that will push the audit records in near real-time.

The agents 266 may also be used to receive instructions from the AMS 210. The instructions that the agents receive may affect the manner in which audit records are sent to audit management system 210. In one embodiment, the agents 266 perform some actions as a result of the audit records triggering some event on the AMS 210. For example, the agents 266 may be configured to alter the timing by which audit records are generated or sent to the AMS 210. The agents 266 may also be instructed to implement a selected policy from policy engine 230 to regulate the manner in which audit records are generated and sent to the AMS 210. For example, one particular agent 266 may receive and execute instructions to disable access to its respective machine 260 in response to AMS 210 detecting a security breach on that machine. The agents 266 may also alter access and use of the application 262. For example, the agent 266 may be instructed to refuse all transactions by a specific user, or to start an audit at a very specific level.

Management Engine

The management engine 220 performs one or more operations on the audit records before writing the data representing the audit records to the databases 250. According to one embodiment, management engine 220 queues the audit records as the audit records are received from applications 262. Queuing the audit records as the records are received from applications 262 enables the applications 262 to send the audit records asynchronously to the AMS 210. One result is that the audit records can be asynchronously transferred from applications 262 to databases 250, but the transfer can be initiated on the applications 262 in near real-time with respect to the generation of the audit records.

The management engine 250 may also access other components or logic to perform other operations on the audit records before the audit records are stored in databases 250. In one embodiment, the management engine 220 performs conversion operations to convert the audit records into a common data structure for all of the audit records, regardless of the different sources that produce the audit records. Alternatively, some or all of the applications 262 can provide audit records in a canonical format for management engine 220.

Figure 4:
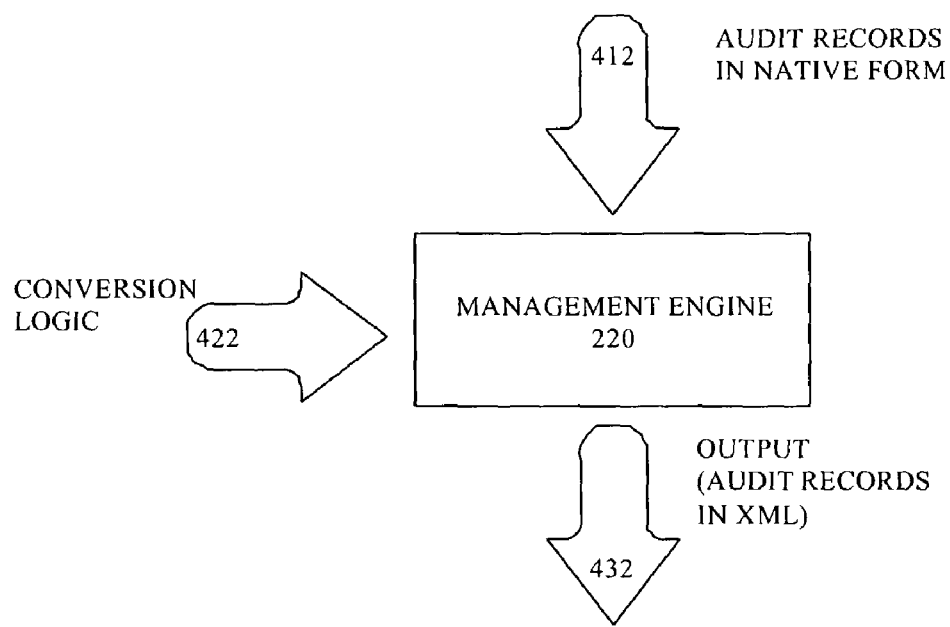
FIG. 4 is a block diagram of a conversion operation that can performed through a management engine of an audit management system.

As an example, the management engine 220 may include mapping logic that identifies the native format of an audit record from a specific application, and converts the audit record from its native format to the common format, which may correspond to XML with a specific schema. FIG. 4 illustrates this functionality of the management engine 220 in more detail. By converting the audit records into a uniform data structure, the data structures can then be more effectively analyzed in the databases 250. For example, the common format of the information contained in the audit records enables the databases 250 to be subsequently queried with the analysis component 275 using one common tool. In an application where XML name-space schema is used, one tool can still be used to analyze the data because the embedded name-space schema describes how to parse and interpret the application specific audit data.

In another embodiment, management engine 220 includes logic to identify audit records containing multiple identifications used by a single user. The management engine 220 may associate audit records originating from the common user together in the databases 250. An example of this functionality is described in greater detail with FIG. 3. Audit records belonging uniquely to the same user may subsequently be analyzed more easily.

Various other functionalities may be incorporated into or associated with the management engine 220 or with the application 262 itself. In one embodiment, management engine 220 may use or call logic to monitor and track a user's session on a network. The management system 220 may correlate the user's activities with audit data obtained from different applications that are utilized by the user. For example, the user's activities may directly or indirectly affect multiple computers and applications. The affected computers and applications may be monitored using audit records generated by different applications. These audit records may be correlated to identify the particular user's actions. Thus, if a hacker accesses a system, audit records generated as a result of the hacker performing certain actions may be correlated and used to track the hacker during the hacker's session on the network. In this way, the session management may be a tool against attacks on a network.

The management engine 220 may also access or call logic while writing the data to the databases 250 so that the data cannot be subsequently be deleted, edited, or updated. Thus, data written to the databases 250 becomes non-repudiatable. One benefit of non-repudiatable data is that it provides electronic "proof". If the audit records are stored permanently, then they are tamper-resistant and can confirm an event or action. Audit records stored in this manner may then be used to facilitate electronic business transactions. In one embodiment, non-repudiatable audit records stored in database 250 may be supplemented with digital signatures or verifications. The digital signatures and verifications may be made onto the audit records before the audit records are sent out from the applications 262. Alternatively, the digital signatures or verifications may be made onto the audit records from the AMS 210.

The management engine 220 may also be combined with traditional database management tools to manage the access of data in databases 250. For example, management engine 220 may access existing logic in a database system where databases 250 reside to ensure that subsequent viewability of data written to the databases is only by authorized users, on a row by row basis. Such a database viewing feature is sometimes referred to as a virtual private database ("VPD"). In such systems, groups of security policies are established for a database schema object, such as a table or a view. A security policy reflects access rules for accessing the database schema object. Access to the database schema object is restricted based on security policy groups selected for a particular user. The security policy groups are selected based on information associated with a user that is maintained or accessed by the database system. An example of such a system is described in U.S. patent application Ser. No. 09/589,602, entitled PARTITIONED ACCESS CONTROL TO A DATABASE, filed on Jun. 7, 2000. This application is hereby incorporated by reference.

Policy Engine

The policy engine 230 executes a policy that determines the manner in which audit records are generated, the content of the audit records, and/or the manner in which the audit records are collected from the applications 262. The policies may be executed separately on different applications 262. Alternatively, some policies may be uniformly executed on all of the applications 262.

In one example, a policy selected by the policy engine 230 causes each application 262 to push an audit record to AMS 210 each time a user enters an incorrect password, accesses a web-site, and/or attempts an unauthorized use of a network resource. The policy executed by the policy engine 230 may record the events that cause the generation of the audit records with varying levels of detail. In one embodiment, policy engine 230 may execute the policy by configuring the agents 266 on the respective machines 260. Alternatively, the policy engine 230 may configure the applications 262 directly.

The policy engine 230 may store the different policies in a directory format. In one embodiment, the policy engine 230 corresponds to a Lightweight Directory Access Protocol (LDAP) device or a Database that stores security policies affecting the generation of audit records.

Enterprise Manager

Enterprise manager 240 may perform actions and make adjustments to AMS 210 or its agents 266 while audit records or being received by the AMS. The enterprise manager 240 may perform the actions and make the adjustments based on events detected from the audit records received by the AMS 210. The analysis component 275 can also analyze the events and trigger the enterprise manager 240 to take certain corrective actions.

In an embodiment, the enterprise manager 240 or analysis component 275 inspects the audit records from the data stored in the databases 250 for events that are designated to require an action to be performed by the enterprise manager 240. The actions may correspond to warnings or notifications that an event has been detected as occurring. The actions may also correspond to responsive adjustments to reconfigure agents 266 and/or the AMS 210. In this way, enterprise manager 240 or analysis component 275 may act as a feedback mechanism that utilizes information provided by the audit records to adjust or reconfigure the operations of the AMS 210 and its agents 266.

In one embodiment, the information inspected by the enterprise manager 240 includes information that forms the header or body portion of the data structure representing the audit record. The information inspected may be mapped to a list or directory of actions that are associated with specific values for identified fields being inspected. An event may correspond to when a particular field of an audit record has a value that designates a particular action. The action associated with the event may be executed on one of the components forming the AMS 210. Examples of such actions include warnings or notifications that are made in response to when the inspected information is deemed to signify a network attack or unauthorized use of network resources. The warning or notification may be made by enterprise manager 240, for example, a security administrator of the network 202.

In one application, enterprise manager 240 inspects data contained in the data structure representing the audit records to identify a user, one or more actions performed by that user on the machine, the time such actions took place, and other information pertaining to the generation of the corresponding audit record. The enterprise manager 240 matches the information to a list of events that are designated to require specific actions. In addition to warning the security administrator of the network of the occurrence of a detected event, the enterprise manager 240 may also cause the execution of a change in policy by policy engine 220. The change in policy may be executed on specific applications 262 directly or through use of corresponding agents 266, or on all of the applications uniformly.

For example, enterprise manager 240 may be configured to notify the administrator of the network each time a user seeks to access a resource on the network that is not authorized for that user. The enterprise manager 240 may also cause a change in policy to occur for that user, where as result of the user's request for unauthorized access, the user is required to re-verify his or her identity.

As another example, the enterprise manager 240 may detect a signature of a hacker and implement security measured to deter or preclude further use of network resources by the hacker. Thus, enterprise manager 240 may shut the network 202 down for the particular user that is detected as being the source of the hacker. Still further, as another example, the enterprise manager 240 may detect large amounts of network traffic through the volume of audit records being recorded in databases 250, and then cause policy engine 230 to execute a new policy where only certain select users can remain on the network 202 or use the application 262.

Various other applications and functions may be provided by enterprise manager 240. One of the basic functions of the enterprise manager 240 is to perform a feedback action as the audit records are received. The enterprise manager 240 may act "on-the-fly" when events are detected from audit records being received by AMS 210. In other words, the enterprise manager 240 may act in near "real-time", with immediate responsiveness, when the events are detected.

Repository

In an embodiment, the repositories correspond to relational memory units, such as databases 250. The AMS 210 may be part of a database management system for managing data stored in the databases 250. As a result, additional functionality and uses can be applied for the data.

In one embodiment, data stored in the databases 250 is permanent, so that it cannot be updated, deleted, or otherwise edited. Thus, the data can be used for non-repudiation purposes. One benefit of such a feature is that transactional and notary services may be performed using the data of the audit record in databases 250 because the data cannot be repudiated-once it is stored in the databases 250, it is not removable or modifiable. This gives the data an evidentiary function. As a result, audit records can be maintained not just for security purposes, but also to keep a tamper-resistant record of the business transactions conducted between computers and parties.

The database management system may incorporate additional functionality or structuring of data when the data is stored in the databases 250. For example, the database management system may be able to store data in the databases 250 using partitions that segment the databases allowing for more efficient searches and quicker analysis. As another example, an OLAP feature may be incorporated into the database management system as part of analysis component 275 for analyzing the data provided by the audit records. The OLAP feature, or other component(s) used by analysis component 275, may utilize the data in either a canonical schema, or in a multitude of schemas.

Analysis Component

Analysis component 275 may be incorporated into AMS 210 to perform analysis of the audit records stored in databases 250. The analysis component 275 may be a traditional database analysis tool, such as an OLAP feature of a database management system. In an embodiment, the analysis component 275 can readily analyze the data in the databases 250 because the common format of the data structures representing the audit records is understood, or because the format is embedded indirectly through the use of name-space schemas. For example, a security administrator may request queries of the data in the databases 250 to determine historical activity on the network. As a result, the analysis component 275 can greatly enhance the ability to determine security breaches on the network across all applications 262 by correlating the data provided by the audit records.

As described, many benefits, are provided by a system such as described in FIG. 2. For example, audit records may be analyzed more accurately. Because audit records are more easily and abundantly generated, the audit records may be stored for use in functions other than those related to security, such as for use as evidence in actions pertaining to business transactions. Furthermore, a system such as described in FIG. 2 may be used to facilitate "separation of duty" amongst administrators and users of the system. The generation of audit records that can be stored in a non-repuditatable medium enables the actions of, for example, the highest level administrators to be recordable. As a result, these users may be monitored to ensure that their actions are authorized on the network where the audit records are generated.

Name Mapping Functionality

Figure 3:
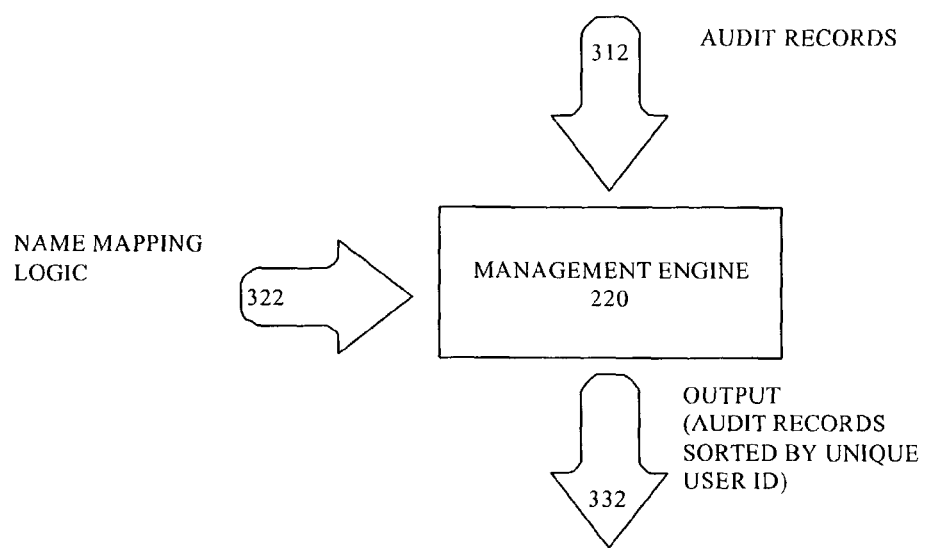
FIG. 3 is a block diagram of a name mapping function performed through a management engine of an audit management system.

FIG. 3 is a block diagram of a name mapping function performed through management engine 220. The name mapping function corresponds to one functionality that can be called or incorporated into the management engine 220 as the AMS 210 (FIG. 2) receives audit records from the various applications 262 (FIG. 2).

The audit records 312 are received by the management engine 220. In response to receiving the audit records 312, the management engine 220 calls name mapping logic 322. The management engine 220 may inspect the audit records 312 to determine a user-identification for individual audit records. The user-identification may be application specific to some degree, in that different applications will record the user-identification information differently. For example, the user "John Doe" may be recorded as "Jdoe" by a first application, "JD1" by a second application, and "John Doe" by a third application. In each case, the user-identification identifies a common user for all three applications. But due to reasons such as variations amongst applications, and differences in how user-identification is entered by the user, frequently multiple identifications, or aliases, result for one user.

The name mapping logic 322 is called by the management engine 220 to map various user-identifications to a common user. This function may be performed while the audit records 312 are being received from the applications 262. In one embodiment, name mapping logic 322 has access to a master-list which identifies all user-identifications for each unique user. The master-list may be stored in LDAP, or in a database, or in a file repository. When the name mapping logic 322 is executed, the output 332 of the management engine 210 is data representing the audit records sorted by unique users. The output 322 is written to the databases 250 (FIG. 2) so that the databases more accurately reflect the users that cause the generation of audit records.

Conversion Operations

FIG. 4 is a block diagram of a conversion operation that can performed through management engine 220. The conversion operation may correspond to another functionality that can be called or incorporated into the management engine 220 as the AMS 210 (FIG. 2) receives audit records from the various applications 262 (FIG. 2).

As shown by FIG. 4, management engine 220 receives audit records 412 from the various applications 262 (FIG. 2) in a native form, or in a canonical form. The native form may be different than the form the management engine 220 uses to store an output 432 of data representing the audit records. The management engine 220 calls logic to convert the audit records from the native form to the form used for storing the output 432 in the database 250 (the "repository form").

In an embodiment, the AMS 210 is configured to work with various applications that produce audit records having different platforms, formats, and structures. The conversion logic 422 may perform conversion operations, including transformations and/or translations, to convert the audit records from their respective native forms to the repository form. In this way, the structure of the output 432 is uniform.

One benefit of an embodiment such as shown by FIG. 4 is that the data representing the audit records after the conversion operations are performed have a common data structure that can more effectively be read and analyzed. For example, because the data structure of the audit records is uniform when stored with databases 250, analysis component 275 may make a single uniform query to databases 250 to identify, for example, the unique identification of the user that generated a group of audit records, even though the audit records in the group were generated using applications that have different native formats.

Structure for Data Representing Audit Records

The repository form of data representing audit records may have a data structure that is provided by a "name-space" schema. The data structure provided by the "name-space" schema declares names and definitions of fields within the data structure itself. This type of data structure permits an analysis component to rely on the data structure, rather than external information, to determine the meaning of fields and data contained within the data structure. Use of a single "name-space" schema for the data structure representing the audit records enables for audit records provided by various different applications to share common fields and formatting once the audit records are subject to conversion operations. Consequently, analysis of the data stored in the databases 250 can be done more effectively.

In one embodiment, the particular language employed for structuring the output data of the management engine 220 is XML. An example of a data structure representing an audit record in XML is provided below. The data structure provided in XML may be separated into a header portion and a body portion. The header portion may contain, as an example, information about the user, the application, and the event that generated the audit record. The body of the data structure may provide information about the action performed by the user, in greater detail. One example of a data structure representing an audit record in XML is as follows:

<Envelope xmlns: Audit="http:// . . . /audit-env>
<A: Header>
<A: UserInfo><A:UserId>MyUserGUID</A:UserId></A:userInfo>
<A:AppInfoAddr>192.129.52.25</A:AppInfoAddr>
<//A:AppInfo>
<A:EventInfo><A:EventTime>022353890123</A:EventTime>
<A: EventLevel>9</A: EventLevel>
<A:EventType>2</A:EventType>
<A:EventInfo>
</A:Header>
<A:Body Tag="MyAuditTag">
<t:TagInfoApp xmlns="http:// . . . /auditInfoForThisApp">XYZ</t:Taginfo>
</A:Body>
</:Envelope>

The header of the data structure provides information about the user, in the form of a global universal identification (GUID). The header also provides information about the event, including the time the event occurred, and the type of event. Information about the application that generated the audit record from which the data structure is formed is also provided in the header. The body of the data structure describes the activity that generated the audit record. For example, the body may list a web site which the user accessed when the audit record was generated.

Hardware Overview

Figure 5:
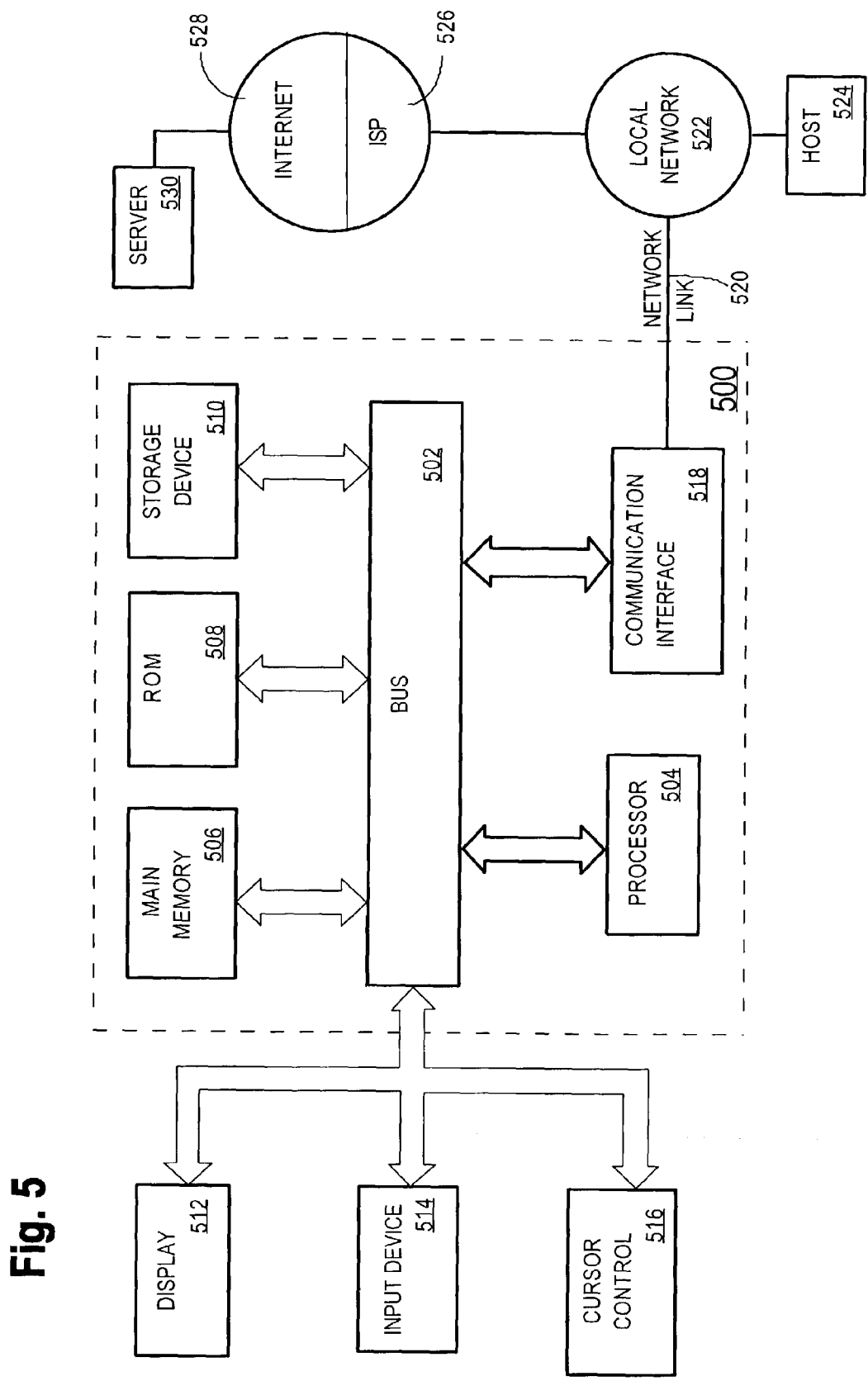
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing audit records, the method comprising:
   automatically receiving, at an audit management computer system, over a network, a plurality of audit records from two or more different applications of a plurality of different applications;
   wherein the plurality of audit records are automatically generated by the plurality of different applications on one or more computing devices in response to events that are designated to generate the plurality of audit records on the plurality of different applications; and
   performing, at the audit management computer system, operations on the plurality of audit records received, wherein the operations include:
      identifying in a first audit record that was generated by a first application of the two or more different applications a first user identification associated with a first user account, wherein the first audit record is in the plurality of audit records automatically received;
      identifying in a second audit record that was generated by a second application a second user identification associated with a second user account, wherein the second audit record is in the plurality of audit records automatically received;
      wherein the first user identification is different than the second user identification and wherein the first user identification and the second user identification are application specific;
      wherein the first user account is different than the second user account;
      determining that first user identification and the second user identification both map to a common user, wherein determining that the first user identification and the second user identification both map to a common user comprises comparing the first user identification and the second user identification to mapping information that identifies multiple user identifications for the common user in the network;

wherein the first audit record describes an event that occurred while the common user was successfully logged in to the first application;

wherein the second audit record describes an event that occurred while the common user was successfully logged in to the second application;

recording the plurality of audit records in a repository; and associating the first audit record and the second audit record with the common user in the repository.

2. The method of claim 1, wherein recording the plurality of audits includes writing data representing the plurality of audit records in the repository.

3. The method of claim 1, further comprising queuing the plurality of audit records prior to recording the plurality of audit records in the repository.

4. A non-transitory computer readable storage medium storing one or more sequences of instructions for managing audit records on a network, wherein execution of the one or more sequences of instructions by one or more processors causes the one or more processors to perform the steps of:

automatically receiving, at an audit management computer system, over a network, a plurality of audit records from two or more different applications of a plurality of different applications;

wherein the plurality of audit records are automatically generated by the plurality of different applications on one or more computing devices in response to events that are designated to generate the plurality of audit records on the plurality of different applications; and performing, at the audit management computer system, operations on the plurality of audit records received, wherein the operations include:

identifying in a first audit record that was generated by a first application of the two or more different applications a first user identification associated with a first user account, wherein the first audit record is in the plurality of audit records automatically received;

identifying in a second audit record that was generated by a second application a second user identification associated with a second user account, wherein the second audit record is in the plurality of audit records automatically received;

wherein the first user identification is different than the second user identification and wherein the first user identification and the second user identification are application specific;

wherein the first user account is different than the second user account;

determining that first user identification and the second user identification both map to a common user, wherein determining that the first user identification and the second user identification both map to a common user comprises comparing the first user identification and the second user identification to mapping information that identifies multiple user identifications for the common user in the network;

wherein the first audit record describes an event that occurred while the common user was successfully logged in to the first application;

wherein the second audit record describes an event that occurred while the common user was successfully logged in to the second application;

recording the plurality of audit records in a repository; and associating the first audit record and the second audit record with the common user in the repository.

5. The method of claim 1, further comprising:

prior to performing the identifying step, converting one or more of the plurality of audit records from a native form of the application which generated the one or more audit records into a canonical form, upon receiving the one or more audit records in the native form.

6. The non-transitory computer readable storage medium of claim 4, further comprising instructions for performing the step of:

prior to performing the identifying step, converting one or more of the plurality of audit records from a native form of the application which generated the one or more audit records into a canonical form, upon receiving the one or more audit records in the native form.

7. The method of claim 1, wherein the mapping information is stored in a database or in one or more files.

8. The method of claim 1, wherein determining that first user identification and the second user identification both map to a common user comprises querying a directory service via a Lightweight Directory Access Protocol for the first user identification and the second user identification.

9. The non-transitory computer readable storage medium of claim 4, wherein the mapping information is stored in a database or in one or more files.

10. The non-transitory computer readable storage medium of claim 4, wherein determining that first user identification and the second user identification both map to a common user comprises querying a directory service via a Lightweight Directory Access Protocol for the first user identification and the second user identification.

11. The non-transitory computer readable storage medium of claim 4, wherein recording the plurality of audits includes writing data representing the plurality of audit records in the repository.

12. The non-transitory computer readable storage medium of claim 4, further comprising instructions that, when executed by the one or more processors, cause performance of: queuing the plurality of audit records prior to recording the plurality of audit records in the repository.

13. The method of claim 1, wherein said identifying in a first audit record, said identifying in a second audit record, said determining, and said associating are performed while the plurality of audit records are being received at the audit management computer system.

14. The non-transitory computer readable storage medium of claim 4, wherein said identifying in a first audit record, said identifying in a second audit record, said determining, and said associating are performed while the plurality of audit records are being received at the audit management computer system.

* * * * *

UNITED STATES PATENT AND TRADEMARK OFFICE
CERTIFICATE OF CORRECTION

| | |
|---|---|
| PATENT NO. | : 7,779,113 B1 |
| APPLICATION NO. | : 10/304383 |
| DATED | : August 17, 2010 |
| INVENTOR(S) | : Samar |

It is certified that error appears in the above-identified patent and that said Letters Patent is hereby corrected as shown below:

In column 10, line 36, delete "non-repuditatable" and insert -- non-repudiatable --, therefor.

Signed and Sealed this
Tenth Day of May, 2011

David J. Kappos
*Director of the United States Patent and Trademark Office*